(12) United States Patent
Churan

(10) Patent No.: US 7,978,135 B2
(45) Date of Patent: Jul. 12, 2011

(54) ANTENNA BEAM FORMING SYSTEMS/METHODS USING UNCONSTRAINED PHASE RESPONSE

(75) Inventor: Gary G. Churan, Annadale, VA (US)

(73) Assignee: ATC Technologies, LLC, Reston, VA (US)

( * ) Notice: Subject to any disclaimer, the term of this patent is extended or adjusted under 35 U.S.C. 154(b) by 163 days.

(21) Appl. No.: 12/370,224

(22) Filed: Feb. 12, 2009

(65) Prior Publication Data
US 2009/0231187 A1 Sep. 17, 2009

Related U.S. Application Data

(60) Provisional application No. 61/029,118, filed on Feb. 15, 2008.

(51) Int. Cl.
*H01Q 3/00* (2006.01)
(52) U.S. Cl. .................................................. 342/377
(58) Field of Classification Search .................. 342/377
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner* — Thomas H Tarcza
*Assistant Examiner* — Harry Liu
(74) *Attorney, Agent, or Firm* — Myers Bigel Sibley & Sajovec

(57) ABSTRACT

Beamforming methods for operating a transceiver including an antenna having a plurality of antenna feed elements include defining a plurality of real valued antenna gain constraint values associated with a plurality of geographic constraint points within a geographic region, and generating complex valued antenna feed element weights that result in complex antenna gain values at the geographic constraint points based on the corresponding real valued antenna gain constraint values. An antenna beam is formed from the antenna to the geographic region using the complex valued antenna feed element weights, and information is transmitted over the antenna beam.

30 Claims, 6 Drawing Sheets

U.S. PATENT DOCUMENTS

| | | |
|---|---|---|
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,340,949 B1 | 1/2002 | Lane et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 | 8/2009 | Karabinis et al. |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,602,837 B2 | 10/2009 | Kotecha |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,394 B2 | 11/2009 | Good et al. |
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,639,981 B2 | 12/2009 | Karabinis |
| 7,653,348 B2 | 1/2010 | Karabinis |
| 7,664,460 B2 | 2/2010 | Karabinis et al. |
| 7,696,924 B2 | 4/2010 | Levin et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0050069 A1* | 3/2003 | Kogiantis et al. ............ 455/450 |
| 2003/0149986 A1 | 8/2003 | Mayfield et al. |
| 2004/0072539 A1 | 4/2004 | Monte et al. |
| 2004/0102156 A1 | 5/2004 | Loner |
| 2004/0121727 A1 | 6/2004 | Karabinis |
| 2004/0203393 A1 | 10/2004 | Chen |
| 2004/0240525 A1 | 12/2004 | Karabinis et al. |
| 2005/0041619 A1 | 2/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0201449 A1 | 9/2005 | Churan |
| 2005/0227618 A1 | 10/2005 | Karabinis et al. |
| 2005/0239399 A1 | 10/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0288011 A1 | 12/2005 | Dutta |
| 2006/0040613 A1 | 2/2006 | Karabinis et al. |
| 2006/0094420 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135070 A1 | 6/2006 | Karabinis |
| 2006/0165120 A1 | 7/2006 | Karabinis |
| 2006/0189275 A1 | 8/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0092019 A1 | 4/2007 | Kotecha et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |

| | | | |
|---|---|---|---|
| 2007/0165752 A1* | 7/2007 | Warner ............. 375/346 |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0051080 A1* | 2/2008 | Walker et al. ............. 455/427 |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0204319 A1 | 8/2008 | Niu et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0264120 A1 | 10/2009 | Karabinis |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |
| WO | 02/51033 A1 | 6/2002 |
| WO | WO 2009/102486 A2 | 8/2009 |
| WO | WO 2010/056524 A1 | 5/2010 |

OTHER PUBLICATIONS

Ayyagari et al., "A satellite-augmented cellular network concept", *Wireless Networks*, Vo. 4, 1998, pp. 189-198.

International Search Report dated Jan. 27, 2010, for corresponding PCT Application No. PCT/US2009/062349, filed Oct. 28, 2009.

Farsakh et al. "Spatial Covariance Based Downlink Beamforming in an SDMA Mobile Radio System" IEEE Transactions on Communications, vol. 46, No. 11 pp. 1497-1506 (1998).

Suzuki et al. "Phased array fed reflector antennas with interpolation network for next generation mobile satellite communication systems" Antennas and Propagation Society Symposium, 2004. vol. 3, pp. 3043-3046.

International Search Report dated Nov. 30, 2009, for corresponding PCT Application No. PCT/US2009/000944, filed Feb. 13, 2009.

Gebauer et al. "Channel-Individual Adaptive Beamforming For Mobile Satellite Communications" IEEE Journal on Selected Areas in Communications, vol. 13, No. 2, pp. 439-448 (1995).

Mao et al. "Investigation of DBF based Co-Channel Signal Separation and Suppression for Mobile Satellite Communications" Vehicular Technology Conference, vol. 5, No. 19, pp. 2731-2734 (1999).

Takao et al. "An Adaptive Antenna Array Under Directional Constraint"Antennas and Propagation, IEEE, vol. AP-24, No. 05, pp. 662-669 (1976-2009).

Gebauer et al., "Channel-Individual Adaptive Beamforming for Mobile Satellite Communications", IEEE Journal on Selected Areas in Communications; vol. 13; Feb. 1995; No. 2, New York, NY, US; pp. 439-448; XP000489309.

Notification of Transmittal of the International Search Report and The Written Opinion of the International Searching Authority, or the Declaration; International Search Report; Written Opinion of the International Searching Authority corresponding to International application No. PCT/US2010/027393; Date of mailing: Jul. 14, 2010; 16 pages.

* cited by examiner

ANTENNA BEAM FORMING SYSTEMS/METHODS USING UNCONSTRAINED PHASE RESPONSE

CROSS REFERENCE TO RELATED APPLICATION

This application claims the benefit of and priority to U.S. Provisional Patent Application No. 61/029,118, filed Feb. 15, 2008, the disclosure of which is hereby incorporated herein by reference as if set forth in its entirety.

FIELD OF THE INVENTION

This invention relates to wireless communications systems and methods, and more particularly to antenna systems and methods for terrestrial and/or satellite wireless communications systems.

BACKGROUND

Beam forming refers to a technique of shaping an antenna gain pattern to improve communications using the antenna. In particular, beam forming refers to techniques for selecting complex weight coefficients ("weights") for antenna feed elements in a multi-element antenna. Signals to be transmitted from the antenna elements are multiplied by respective weights prior to transmission. Signals received by the antenna elements are multiplied by respective weights before being combined for processing.

Beam forming techniques have been applied to many modern mobile satellite systems (MSS). With multiple transmitting and receiving antenna feed elements, a satellite beam former forms a plurality of service area spot-beams (or cells) in both the forward link and the reverse link by using advanced antenna array signal processing. Beam forming can increase the average signal to noise and/or signal to interference ratio by focusing energy into desired directions in either the forward link or the reverse link. By estimating the response to each antenna element to a given user or a given location, and possible interference signals, a satellite/gateway can combine the elements with weights obtained as a function of each element response to improve the average desired signal and reduce other components, whether noise, interference or both. The spot-beams may be, for example, either fixed to an area or adaptive to particular users and/or interference environments depending, for example, on application scenarios and/or design considerations.

SUMMARY

Some embodiments provide methods of operating a satellite transceiver including an antenna having a plurality of antenna feed elements. The methods include defining a plurality of real valued antenna gain constraint values associated with a plurality of geographic constraint points within a geographic region, and generating complex valued antenna feed element weights that result in complex antenna gain values at the geographic constraint points based on the corresponding real valued antenna gain constraint values. An antenna beam is formed from the antenna to the geographic region using the complex valued antenna feed element weights, and information is transmitted over the antenna beam.

In some embodiments, the complex antenna gain values at the geographic constraint points have real components that are equal to the corresponding real valued antenna gain constraint values.

Generating the complex valued antenna feed element weights may include evaluating a constraint function that relates the real valued antenna gain constraint values to the complex valued antenna feed element weights. Evaluating the constraint function may include forming a cost function that is related to a total received power, and evaluating the constraint function to find a set of complex valued antenna feed element weights that reduces the cost function.

The cost function may be $$w^H R_y w = \text{MIN}$$

where w is a vector of M feed element weights, Ry is an M×M covariance matrix for the M feed elements, and MIN is a scalar value.

The constraint function may be $$C^H w = f$$

where w is a vector of M feed element weights, C is an M×K constant matrix containing responses of the M feed elements at K constraint points and f is a desired response vector at the K constraint points.

Evaluating the constraint function to find a set of complex valued antenna feed element weights that reduces the cost function may include forming a combined expression for the constraint function and the cost function using Lagrange multipliers, differentiating the combined expression with respect to the complex valued antenna feed element weights, setting the differentiated combined expression equal to zero and obtaining the complex valued antenna feed element weights in terms of the Lagrange multipliers, and substituting the complex valued antenna feed element weights into the constraint function.

The methods may further include measuring a complex antenna gain value, transmitting the measured complex antenna gain values to the transceiver, and adjusting the complex valued antenna feed element weights in response to the measured complex antenna gain value.

In some embodiments, generating the complex valued antenna feed element weights may include evaluating a cost function that may include squared differences between real components of the complex antenna gain values and the real valued antenna gain constraint values. The real valued antenna gain constraint values include soft constraint values.

In some embodiments, the cost function may be $$\sum_{n=1}^{N} y'_n y'^*_n + \sum_{p=1}^{P} (\text{Re}\{y''_p\} - f_p)^2 = \text{MIN}$$

where $y'_n$ denotes composite amplitude response values at N geographic constraint points having zero amplitude antenna gain constraint values, $y''_p$ denotes composite amplitude response values at P geographic constraint points having non-zero amplitude antenna gain constraint values, and $f_p$ denotes desired real amplitude components at the P geographic constraint points.

The methods may further include weighting composite amplitude response values to emphasize respective geographic constraint points based on their relative geographic importance. Accordingly, in some embodiments, the cost function may be $$\sum_{n=1}^{N} c'_n y'_n y'^*_n + \sum_{p=1}^{P} c''_p (\text{Re}\{y''_p\} - f_p)^2 = \text{MIN}$$

where $c'_n$ and $c''_n$ include user-defined weighting vectors.

The methods may further include generating a set of complex antenna feed element weights that reduces the cost function.

A transceiver according to some embodiments includes an antenna having a plurality of antenna feed elements, and an electronics system including a beam former configured to generate complex valued antenna feed element weights that result in complex antenna gain values associated with a plurality of geographic constraint points within a geographic region of the antenna based on corresponding real valued antenna gain constraint values defined for the plurality of geographic constraint points, and to form an antenna beam from the antenna to the geographic region using the complex valued antenna feed element weights.

The complex antenna gain values at the geographic constraint points may have real components that are equal to the corresponding real valued antenna gain constraint values.

The beam former may be further configured to evaluate a constraint function that relates the real valued antenna gain constraint values to the complex valued antenna feed element weights.

The beam former may be further configured to form a cost function that is related to a total received power, and to evaluate the constraint function to find a set of complex valued antenna feed element weights that reduces the cost function.

The beam former may further be configured to evaluate the constraint function to find a set of complex valued antenna feed element weights that reduces the cost function by forming a combined expression for the constraint function and the cost function using Lagrange multipliers, differentiating the combined expression with respect to the complex valued antenna feed element weights, setting the differentiated combined expression equal to zero and obtaining the complex valued antenna feed element weights in terms of the Lagrange multipliers, and substituting the complex valued antenna feed element weights into the constraint function.

The beam former may further be configured to receive a measured complex antenna gain value to the transceiver, and to adjust the complex valued antenna feed element weights in response to the measured complex antenna gain value.

In some embodiments, the beam former may be configured to generate the complex valued antenna feed element weights by evaluating a cost function that may include squared differences between real components of the complex antenna gain values and the real valued antenna gain constraint values. The real valued antenna gain constraint values include soft constraint values.

The beam former may further be configured to weight composite amplitude response values to emphasize respective geographic constraint points based on their relative geographic importance.

The beam former may be configured to generate a set of complex antenna feed element weights that reduces the cost function.

A communications satellite according to some embodiments includes an antenna having a plurality of antenna feed elements, and an electronics system including a beam former configured to generate complex valued antenna feed element weights that result in complex antenna gain values associated with a plurality of geographic constraint points within a geographic region of the antenna based on corresponding real valued antenna gain constraint values defined for the plurality of geographic constraint points, and to form an antenna beam from the antenna to the geographic region using the complex valued antenna feed element weights.

A satellite gateway according to some embodiments includes an electronics system including a beam former configured to generate complex valued antenna feed element weights for antenna feed elements of an antenna of a remote satellite that result in complex antenna gain values associated with a plurality of geographic constraint points within a geographic region of the satellite antenna based on corresponding real valued antenna gain constraint values defined for the plurality of geographic constraint points, and to transmit the complex valued antenna feed element weights to the satellite for use in forming an antenna beam from the satellite antenna to the geographic region.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1A:
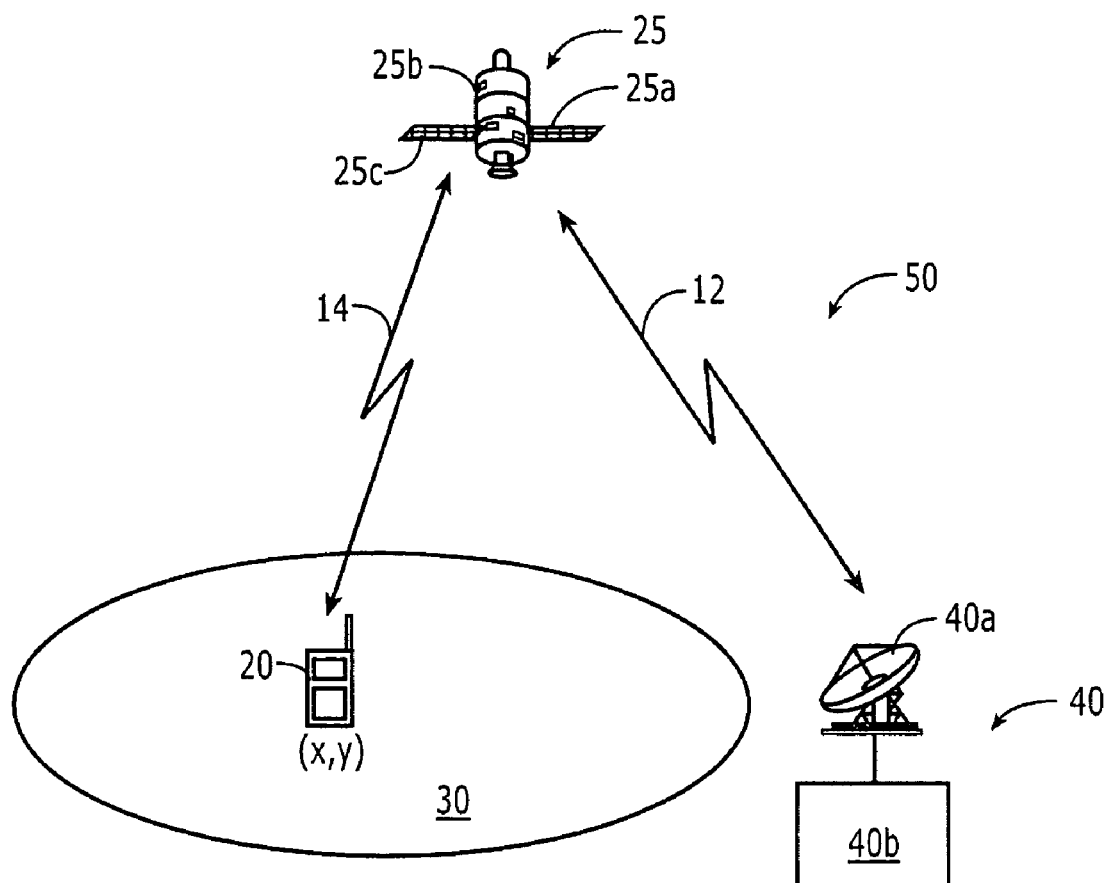
FIG. 1A illustrates exemplary communications systems/methods according to some embodiments.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Beam forming techniques have been applied to many communications systems, including mobile satellite systems (MSS). With multiple transmitting and receiving antenna feed elements, a satellite beam former may form a plurality of service area spot-beams (or cells) in the forward link and the reverse link by using advanced antenna array signal processing. An important goal of beam forming is to increase the average signal to noise and/or signal to interference ratio of a link by focusing energy into desired directions in either the forward link or the reverse link. By estimating the response to each antenna element to a given user or a given location, and possible interference signals, a satellite/gateway can combine the elements with weights obtained as a function of each element response to improve the average desired signal and/or to reduce other components, such as noise, interference or both. The spot-beams may be, for example, either fixed to an area or adaptive to particular users and/or interference environments depending, for example, on application scenarios and/or design considerations.

A system 50 according to some embodiments of the invention is illustrated in FIG. 1A. Although embodiments are described herein in connection with satellite radio communications systems, it will be appreciated that the present invention can be embodied in other types of wireless communications systems, including terrestrial wireless communications systems, fixed and/or mobile wireless communications systems, hybrid satellite/terrestrial communications systems, etc.

Referring to FIG. 1A, a radioterminal 20 is located in a geographic cell 30 based on the geographic (x,y) coordinates of the radioterminal 20. The geographic coordinates of the radioterminal 20 may be determined, for example, by a GPS processor within the radioterminal 20. The radioterminal 20 is also located within the geographic footprint of a satellite 25, which may be a low-earth orbiting satellite (LEO), a medium-earth orbiting satellite (MEO), and/or a geostationary satellite. The satellite 25, which includes an antenna 25*a* and an electronics system 25*b*, communicates with at least one satellite gateway 40, which includes an antenna 40*a* and an electronics system 40*b* via a feeder link 12. The satellite antenna 25*a* may include an array of antenna feed elements 25*c*, which generate signals covering respective overlapping geographic areas in the geographic footprint of the satellite 25.

The radioterminal 20 may determine its geographic coordinates (x,y), and may transmit the geographic coordinates to the satellite gateway 40 via a return link communications channel carried by a service link 14 to the satellite 25. Based on the location of the radioterminal 20, the satellite 25 and/or the satellite gateway 40 may determine a statistical average gain for use in generating channel estimates for the radioterminal 20 for use in adaptive beamforming systems and/or methods according to embodiments of the invention.

Figure 1B:
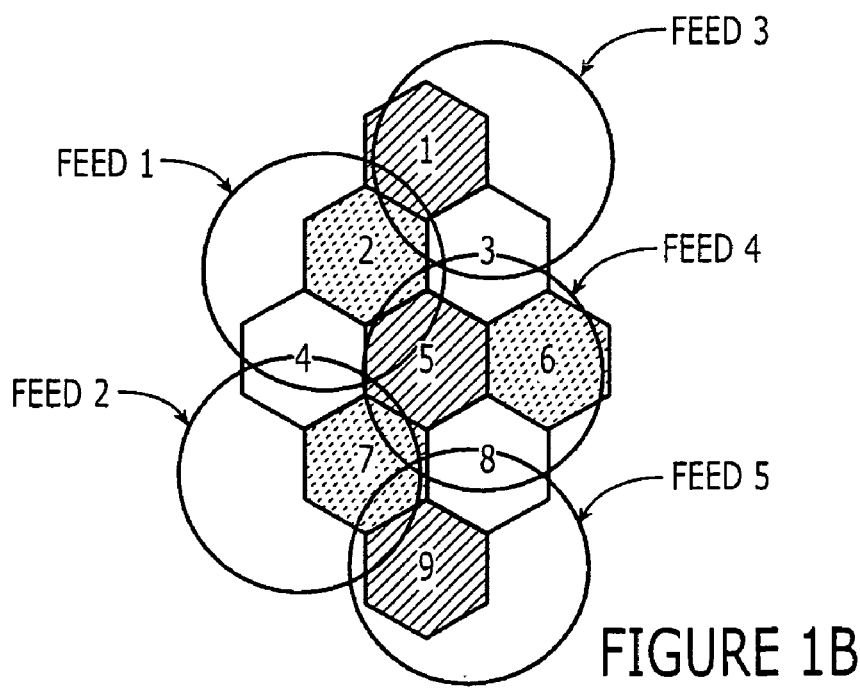
FIG. 1B schematically illustrates an exemplary footprint of five satellite forward link feed elements that are superimposed over a virtual cell configuration.

FIG. 1B schematically illustrates an exemplary footprint of five satellite forward link feed elements that are superimposed over a virtual cell configuration, assuming a frequency reuse ratio of three, for a satellite transmit beamforming system. In FIG. 1B, the idealized footprints of five antenna feed elements are transposed over nine virtual cells defined by their actual physical locations within the satellite footprint. Cells 1, 5 and 9 use a first frequency, while cells 3, 4 and 8 use a second frequency and cells 2, 6, and 7 use a third frequency.

Figure 2:
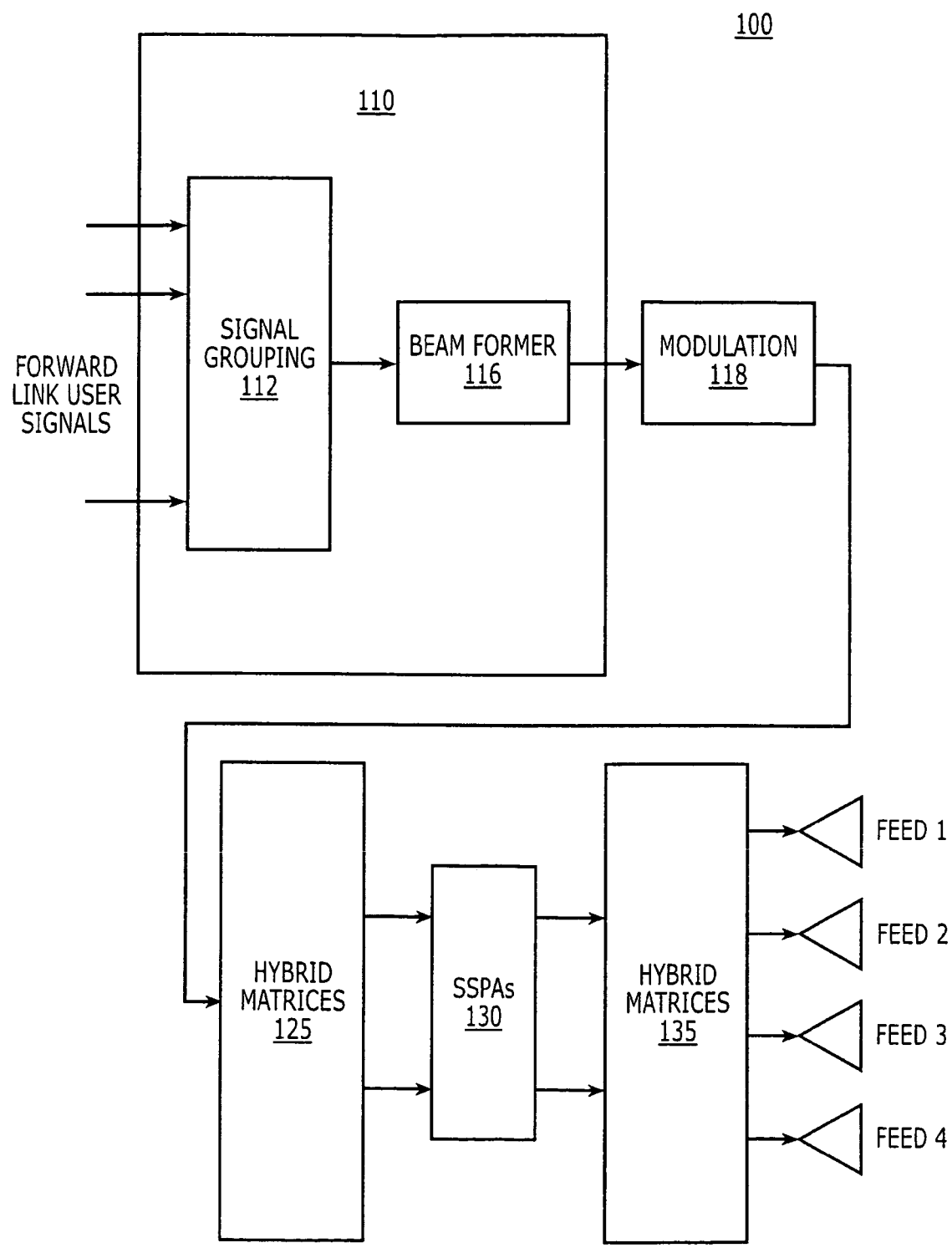
FIG. 2 illustrates a transmitter including a multiple feed antenna according to some embodiments.

A block diagram that illustrates beamforming systems and/or methods for a forward link transmitter 100 according to some embodiments of the invention is shown in FIG. 2. The transmitter 100 may be implemented, for example, in a satellite and/or in a satellite gateway.

The transmitter 100 includes a controller 110 that is configured to perform certain data processing operations on data signals that are to be transmitted by the transmitter 100. For example, the controller 110 may be configured to perform encoding, interleaving, grouping, and/or other operations. In the transmitter 100, forward link user signals are grouped into N frequency bands and are associated with subgroups of feed elements (block 112). Although four feed elements Feed 1 to Feed 4 are illustrated in FIG. 2, it will be appreciated that more or less feed elements could be employed.

Beams are formed by beam formers 116. In beamforming, complex weights are generated for each of the feed elements. Signals transmitted by the feed elements are multiplied by the respective complex weights, resulting in a desired signal gain pattern within the footprint, or geographic service region, of the antenna.

The formed beams are modulated by RF modulation (block 118) and amplified by solid state power amplifiers (SSPAs) 130, and then transmitted by each feed element Feed 1 to Feed M in parallel. In order to equalize the signal input levels applied to the individual transmit amplifiers, and therefore maintain the amplifiers within their proper signal level range, hybrid matrix amplifier configurations are commonly used onboard communication satellites. A typical hybrid matrix amplifier is comprised of a set of N ($N=2^n$, where n is an integer) parallel amplifiers located symmetrically between two, cascaded N-input by N-output multi-port hybrid matrix devices. In a typical hybrid matrix amplifier arrangement, N individual amplifier input signals are supplied by the N outputs of the N×N Input multi-port hybrid matrix 125, and the N SSPAs 130 output signals are similarly applied to the input section of the N×N Output multi-port hybrid matrix 135.

It will be appreciated that the beam formers 116 may form beams in a fixed manner or in an adaptive, closed loop manner, in which measured antenna gain values are fed back to the beam former and used to dynamically adjust the complex antenna feed element weights.

It will be further appreciated that in some embodiments, the beamforming function may be performed in the electronics system 25b of the satellite 25 and/or in the electronics system 40b of the satellite gateway 40.

When methods such as Linearly Constrained Minimum Variance (LCMV) are used to generate beam weights from a set of complex feed element patterns, the constraint points used to define the beam constrain the phase as well as amplitude. For beam coverage performance, only the gain over the coverage area is of importance, whereas the phase is not critical. However, the specified phase at each constraint point strongly affects the ability to achieve optimum gain performance. To help select the most compatible phase at each constraint point, a two-step process can be performed, where the first step solves the beam weights for a single constraint point at the beam center to determine the "natural" phase distribution at the other constraint points. The second solution step then uses all the constraint points, where the phase constraints are specified from the solution to the first step. This, however, does not guarantee optimum gain performance.

Thus, embodiments of the invention provide beam forming methods that do not explicitly require the phase to be specified at the constraint points. This may be achieved by constraining only the real part of the complex amplitude response at each point, leaving the imaginary part (and hence phase) unconstrained. Some embodiments are based on the LCMV method and can be applied to both fixed and adaptive beam forming. Other embodiments provide a fixed-beam solution based on a least-squares algorithm.

Some potential benefits of phase-unconstrained beam forming are twofold: 1) gain performance may not be compromised to meet arbitrary phase constraints, and 2) for LCMV the degrees of freedom used by the constraint points are reduced by half, allowing the algorithm more degrees of freedom to reduce side lobes. Somewhat offsetting this is the fact that the gains at the constraint points are not absolutely fixed, since only the real part of the amplitude response is constrained. So the constraints can be viewed as establishing a minimum gain at each point, which can vary upward due to the contribution of the imaginary response. Nonetheless, as long as the phase distributions of the contributing feed element patterns are reasonably "well-behaved", these phase-unconstrained methods are able to produce good-quality results.

I. Phase Unconstrained LCMV Approach

For the Phase Unconstrained LCMV approach, it is instructive to derive the basic (phase constrained) LCMV solution first, and then show how this solution can be modified for the phase unconstrained case.

The LCMV method attempts to reduce and/or minimize total received power subject to maintaining certain specified responses at the constraint points. The cost function to be minimized is given by:

$$w^H R_y w = \text{MIN}. \quad (1)$$

where w is the vector of M feed element weights to be determined, and $R_y$ is the M×M covariance matrix. The constraint function is given by:

$$C^H w = f \quad (2)$$

where C is the M×K constraint matrix containing the responses of the M feed elements at K constraint points, and f is the desired response vector at the K constraint points.

The simultaneous solution to (1) and (2) is obtained using the method of Lagrange multipliers by forming the combined expression:

$$H(w) = w^H R_y w + \lambda^H [C^H w - f] \quad (3)$$

where $\lambda$ is the vector of K complex Lagrange multipliers to be determined. Differentiating (3) with respect to the complex weights w and setting the results equal to zero yields the following:

$$w = -R_y^{-1} C \lambda \quad (4)$$

Substituting (4) into (2) and solving for $\lambda$ yields:

$$\lambda = -[C^H R_y^{-1} C]^{-1} f \quad (5)$$

Finally, substituting (5) back into (4) produces the well known solution for the weight vector w:

$$w = R_y^{-1} C [C^H R_y^{-1} C]^{-1} f \text{ (phase constrained LCMV)} \quad (6)$$

For the phase-unconstrained solution, some embodiments modify the constraint function (2) so that only the real part is constrained:

$$Re\{C^H w\} = f \quad (7)$$

It follows that the desired response vector f in this case must also be real-valued. Using the identity $Re\{\alpha\} = 0.5(\alpha + \alpha^*)$, we can rewrite (7) as:

$$C^H w + [w^H C]^T = 2f \quad (8)$$

Proceeding as before, the combined expression H(w) becomes:

$$H(w) = w^H R_y w + \lambda^H [C^H w + [w^H C]^T - 2f] \quad (9)$$

Differentiating (9) with respect to the complex weights w and setting the results equal to zero yields the same expression as for the phase-constrained case, namely:

$$w = -R_y^{-1} C \lambda \quad (10)$$

In order to obtain a realizable solution, some embodiments may impose one further requirement that $\lambda$ also be real valued. Then substituting (10) into (7) and solving for $\lambda$ yields:

$$\lambda = -[Re\{C^H R_y^{-1} C\}]^{-1} f \quad (11)$$

Finally, substituting (11) back into (10) produces the solution for the weight vector w for the phase-unconstrained case:

$$w = R_y^{-1} C [Re\{C^H R_y^{-1} C\}]^{-1} f \quad (12)$$

II. Phase Unconstrained Least-Squares Method

The least-squares embodiment reduces or minimizes the sum of the squared differences between the least-squares solution and desired responses at a specified number of geographic points. This embodiment has the potential advantage of being able define an unlimited number of "soft" constraint points, which facilitates the design of large regional-type beams. The term "soft" indicates that the least squares solution does not guarantee that the desired constraint values will be exactly achieved. For this reason, the number of constraint points can exceed the degrees of freedom.

Let $a_{mk}$ denote the complex amplitude response of feed element "m" ($1 \leq m \leq M$) toward a given geographic constraint point "k". Let $y_k$ denote the composite amplitude response at point "k" comprised of the M weighted feed element contributions. In matrix notation:

$$y = A^H w \quad (13)$$

To facilitate the derivation, it is helpful to separate the zero-valued constraint points (nulls) from the non-zero constraint points. Denote the responses associated with N null points as $a'_{mn}$ and $y'_n$, and those associated with P non-zero constraint points as $a''_{mp}$ and $y''_p$. Then:

$$y' = A'^H w \text{ (null points)} \quad (14a)$$

$$y'' = A''^H w \text{ (non-zero constraint points)} \quad (14b)$$

Now let $y'_n y'^*_n$ and $y''_p y''^*_p$ denote the least-squares gains associated with the N null points and P non-zero constraint points, respectively. It is desirable to reduce, or ideally minimize, the squared error between these terms and the desired gains at the given constraint points as follows:

$$\sum_{n=1}^{N} (y'_n y'^*_n - 0)^2 + \sum_{p=1}^{P} (y''_p y''^*_p - g_p)^2 = \text{MIN} \quad (15)$$

where $g_p$ is the desired gain at non-zero constraint point "p", and:

$$y'_n = \sum_{m=1}^{M} w_m a'^*_{mn} \quad (16)$$

$$y''_p = \sum_{m=1}^{M} w_m a''^*_{mp} \quad (17)$$

The next step in the solution involves differentiating (15) with respect to each of the weights w and setting the results equal to zero. However, this leads to terms containing products of the various weights that cannot be solved algebraically. Therefore cost function (15) can be modified so that a linear system in w is produced following the differentiation step. These modifications are applied separately to the null terms and non-zero constraint terms as follows:

Null terms containing $y'_n y'^*_n$: Since $y'_n y'^*_n$ is real and non-negative for all n, the minimization of (15) can be achieved without the need for squaring the $y'_n y'^*_n$ terms. Moreover, differentiation of $y'_n y'^*_n$ with respect to the weights w leads to a linear system of equations in w. So replacing $[y'_n y'^*_n]^2$ with $y'_n y'^*_n$ in (15) is a suitable substitution.

Non-zero constraint terms containing $y''_p y''^*_p$: Removing the squaring operation is not permissible for these terms because the desired gains $g_p$ would be lost after the differentiation step (i.e., $dg_p/dw = 0$). Instead, we replace $y''_p y''^*_p$ with $Re\{y''_p\}$, that is, the real part of the composite amplitude response at point "p". That is, for the non-zero constraint points, only the real component of the composite amplitude is used to generate the feed element weights according to some embodiments.

The above two substitutions lead to the following modified cost function:

$$\sum_{n=1}^{N} c'_n y'_n y'^*_n + \sum_{p=1}^{P} c''_p (Re\{y''_p\} - f_p)^2 = \text{MIN} \quad (18)$$

where $f_p$ is the desired real amplitude component at non-zero constraint point "p". User-defined weighting factors $c'_n$ and $c''_p$ have also been added to provide the ability to emphasize or de-emphasize individual constraint points based on their relative geographic importance. For example, if it is desired to improve the side lobe isolation in a certain geographic region, the null constraint points inside that region can be weighted more heavily than the others. A similar effect can be achieved using LCMV by assigning different EIRP values to the out-of-beam transmit source points. The values of $c'_n$ and $c''_p$ are assumed to be real and non-negative.

Differentiating (18) with respect to the weights w and setting the results equal to zero yields:

$$\sum_{n=1}^{N} c'_n y'_n a'_{qn} + \sum_{p=1}^{P} c''_p Re\{y''_p\} a''_{qp} = \sum_{p=1}^{P} c''_p f_p a''_{qp}, \quad (19)$$

$$1 \leq q \leq M$$

Eq. (19) can be split into real and imaginary parts as follows:

$$\sum_{n=1}^{N} c'_n \operatorname{Re}\{y'_n a'_{qn}\} + \sum_{p=1}^{P} c''_p \operatorname{Re}\{y''_p\} \operatorname{Re}\{a''_{qp}\} = \quad \text{(Real Part) (20)}$$

$$\sum_{p=1}^{P} c''_p f_p \operatorname{Re}\{a''_{qp}\},$$

$$1 \le q \le M$$

$$\sum_{n=1}^{N} c'_n \operatorname{Im}\{y'_n a'_{qn}\} + \sum_{p=1}^{P} c''_p \operatorname{Re}\{y''_p\} \operatorname{Im}\{a''_{qp}\} = \quad \text{(Imag. Part) (21)}$$

$$\sum_{p=1}^{P} c''_p f_p \operatorname{Im}\{a''_{qp}\},$$

$$1 \le q \le M$$

Substituting the expressions for $y'_n$ and $y''_p$ from (16) and (17) into (20) and (21), combining like terms, and simplifying yields the following set of linear equations in w:

$$\sum_{m=1}^{M} \{w_m^{Re} u_{qm}^{Re} + w_m^{Im} u_{qm}^{Im}\} = \psi_q^{Re}, \; 1 \le q \le M \quad (22)$$

$$\sum_{m=1}^{M} \{-w_m^{Re} v_{qm}^{Im} + w_m^{Im} v_{qm}^{Re}\} = \psi_q^{Im}, \; 1 \le q \le M \quad (23)$$

where:

$$u_{qm} \equiv \sum_{n=1}^{N} c'_n a'^*_{qn} a'_{mn} + \sum_{p=1}^{P} c''_p a''_{qp}{}^{Re} a''_{mp} \quad (24)$$

$$v_{qm} \equiv \sum_{n=1}^{N} c'_n a'^*_{qn} a'_{mn} + j \sum_{p=1}^{P} c''_p a''_{qp}{}^{Im} a''_{mp} \quad (25)$$

$$\psi_q \equiv \sum_{p=1}^{P} c''_p f_p a''_{qp} \quad (26)$$

As shorthand notation, the superscripts "Re" and "Im" above specify the real or imaginary parts, respectively, of the associated terms. So (22) and (23) produce a total of 2M independent equations from which the real and imaginary parts of the M feed element weights can be solved.

Figure 3:
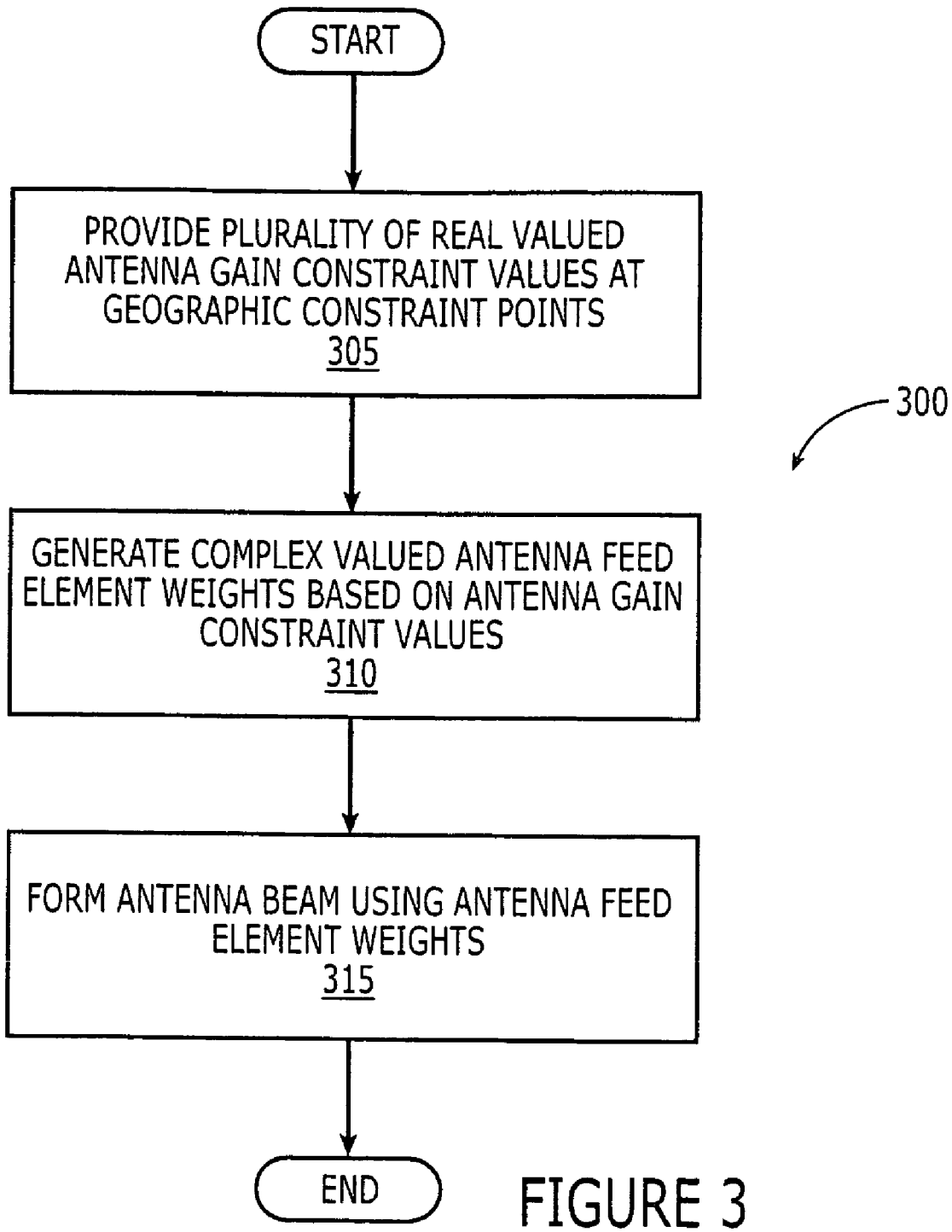
FIGS. 3, 4A and 4B are flowcharts illustrating systems and/or methods according to some embodiments.
Figure 4A:
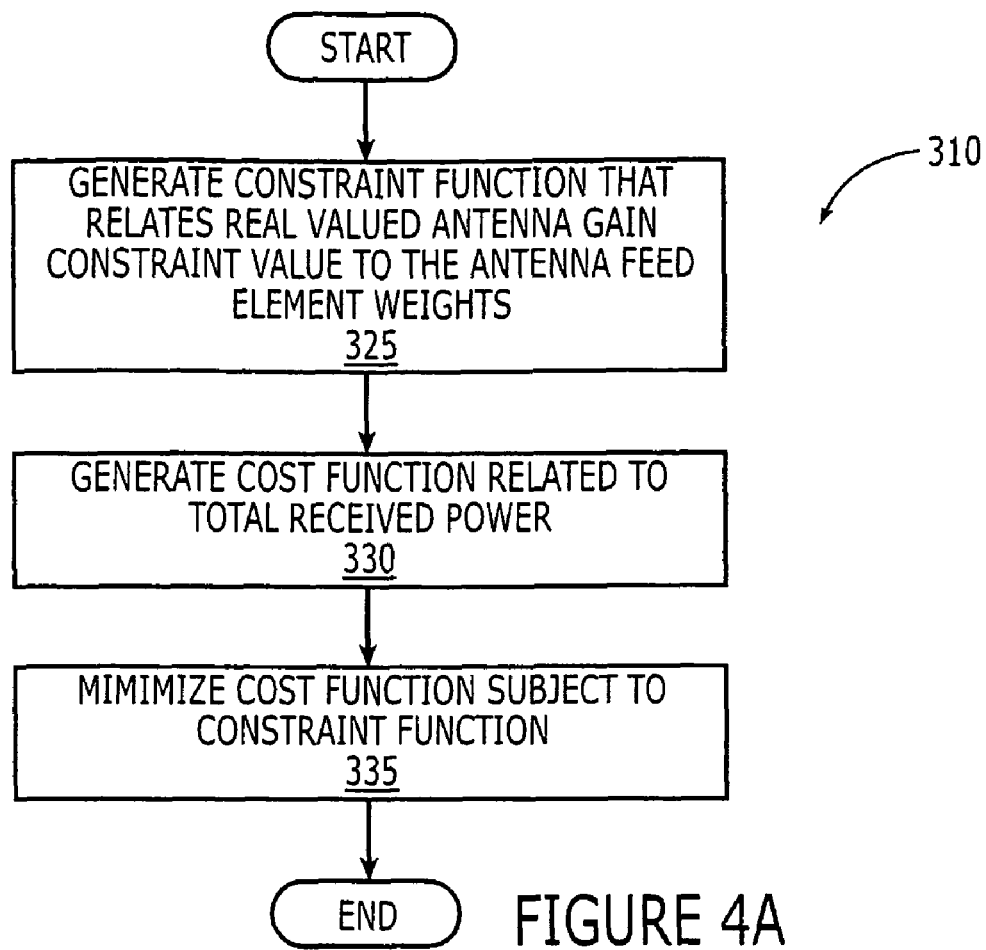
Figure 4B:
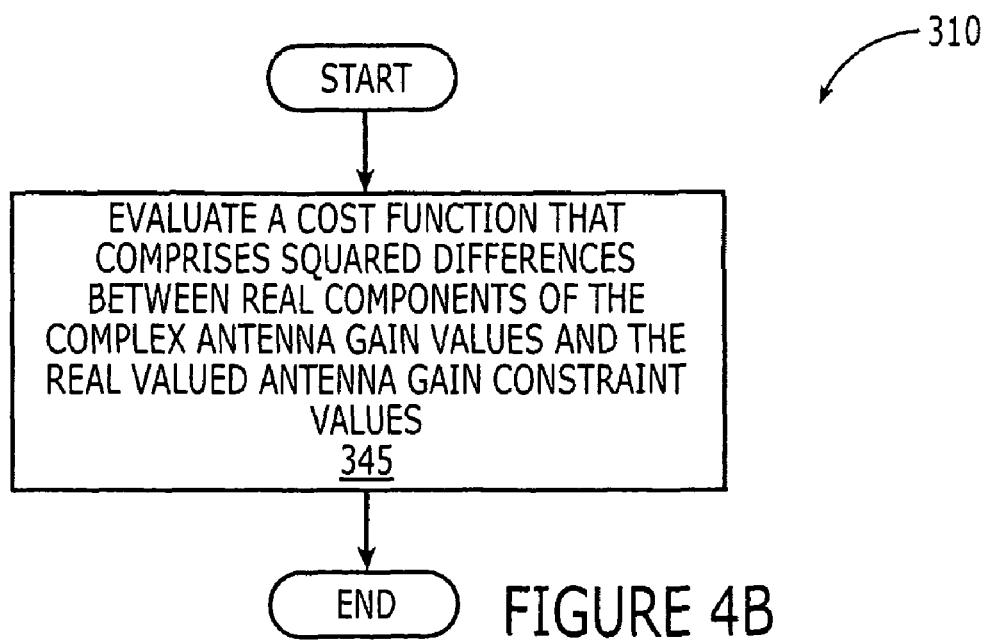

Accordingly, phase-unconstrained beamforming systems/methods are illustrated in more detail in the flowcharts of FIGS. 3, 4A and 4B. Referring to FIG. 3, beamforming systems/methods according to some embodiments define a plurality of real valued antenna gain constraint values associated with a plurality of geographic constraint points within a geographic region (Block 305). Complex valued antenna feed element weights are generated that result in complex antenna gain values at the geographic constraint points based on the corresponding real valued antenna gain constraint values (Block 310). An antenna beam is then formed from the antenna to the geographic region using the complex valued antenna feed element weights (Block 315).

Referring to FIG. 4A, in an LCMV based method, generating complex valued antenna feed element weights (Block 310 of FIG. 3) includes generating a constraint function that relates the real valued antenna gain constraint values to the complex valued antenna feed element weights (Block 325), generating a cost function that is related to total received power (Block 330), and evaluating the constraint function to find a set of complex valued antenna feed element weights that reduces or minimizes the cost function subject to the constraint function (Block 335).

Referring to FIG. 4B, in a least squares based method, generating complex valued antenna feed element weights (Block 310 of FIG. 3) includes evaluating a cost function that comprises squared differences between real components of the complex antenna gain values and the real valued antenna gain constraint values (Block 345).

The foregoing embodiments realize phase-unconstrained beamforming by constraining the real part of the complex amplitude response at the constraint points, allowing the imaginary part and hence phase to remain unconstrained. Alternatively, it will be appreciated that phase-unconstrained beam forming can similarly be implemented by constraining the imaginary part of the complex amplitude response to be equal to imaginary valued antenna gain constraint values corresponding to the constraint points, thereby allowing the real part and hence phase to remain unconstrained.

III. Beam Forming Example

An example regional beam similar to the MSAT East beam may be designed using the phase-unconstrained LCMV and least-squares embodiments. The placement of constraint points and EIRP sources for exemplary LCMV and least-squares models are shown in FIGS. 3 and 4, respectively. For phase-unconstrained LCMV (FIG. 3), the number of constraint points is kept low to maintain sufficient degrees of freedom for reducing side lobes. For the least-squares model (FIG. 4), the number of constraint points is unlimited so many more can be defined.

Figure 5:
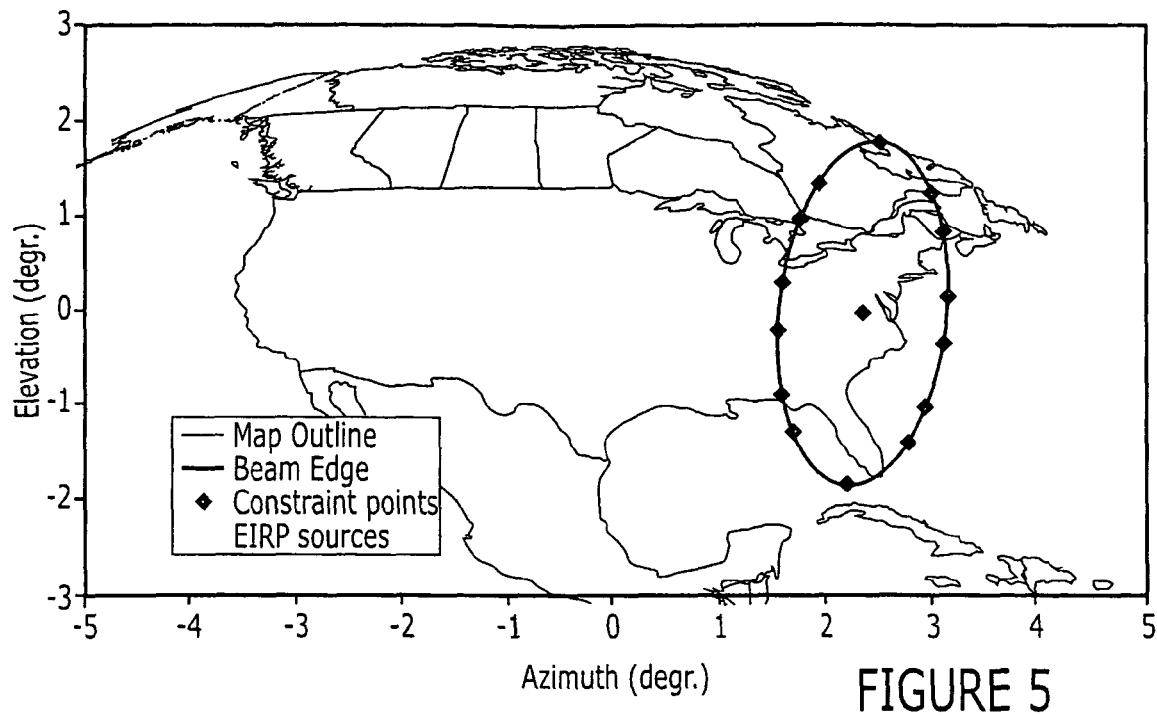
FIG. 5 illustrates exemplary constraint point and EIRP source placement using a phase-unconstrained Linearly Constrained Minimum Variance (LCMV) method according to some embodiments.
Figure 6:
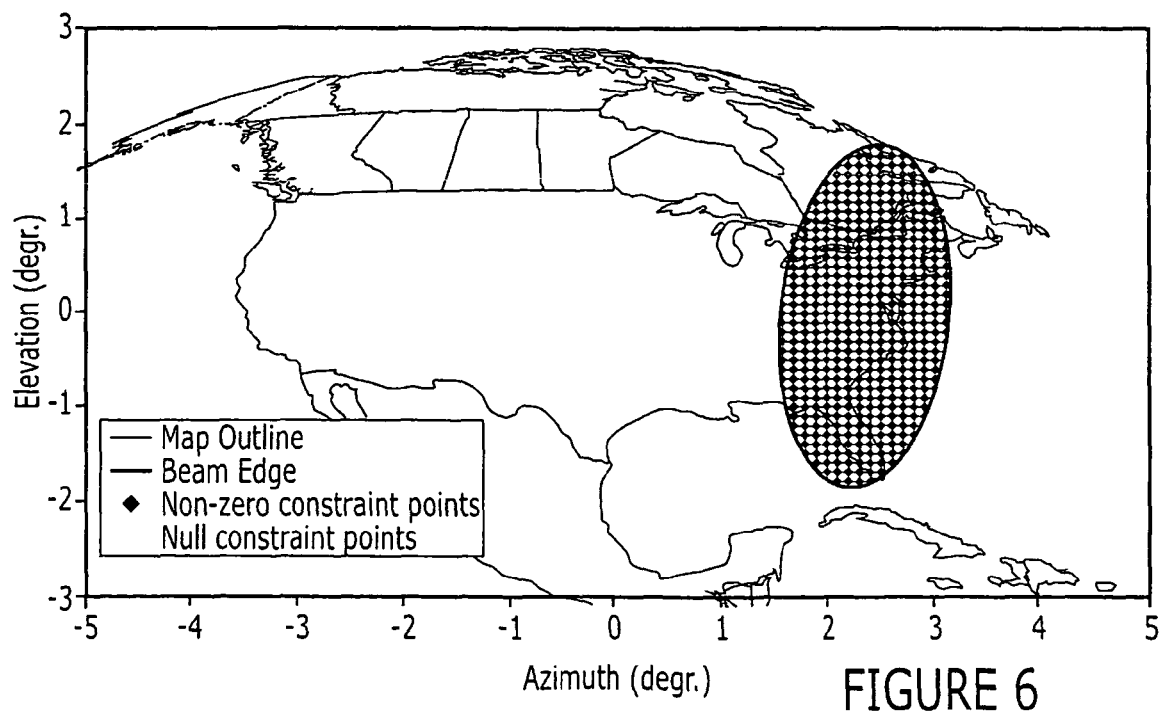
FIG. 6 illustrates exemplary constraint point and EIRP source placement using a phase-unconstrained least squares method according to some embodiments.
Figure 7:
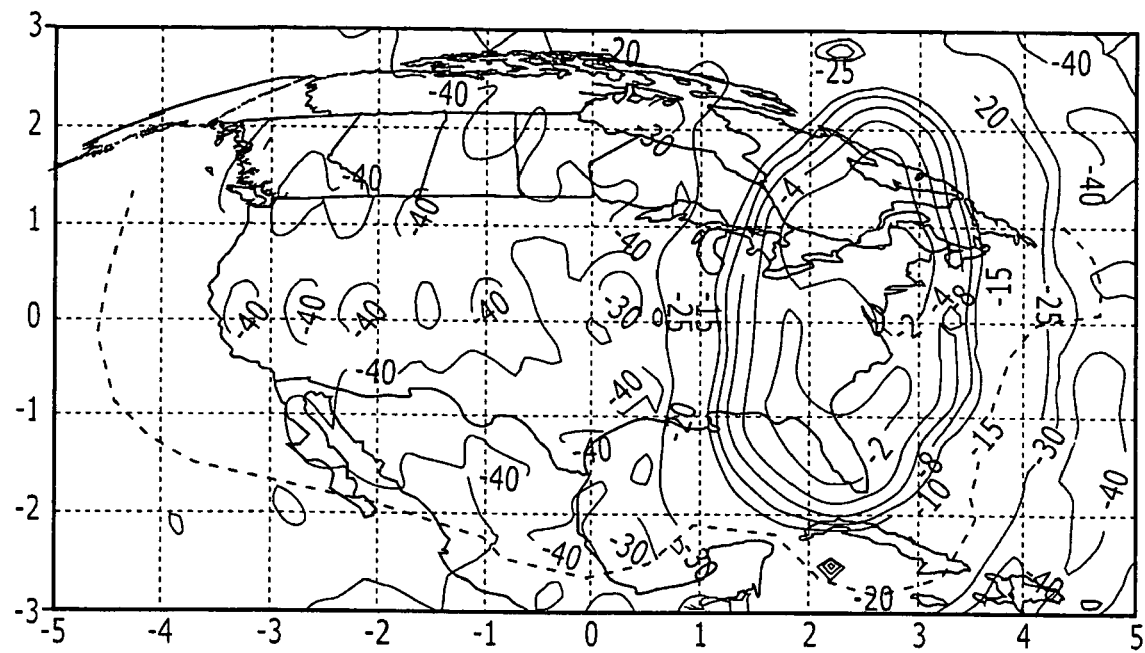
FIG. 7 illustrates beam gain contours (in dB) generated using a phase-unconstrained LCMV method according to some embodiments.
Figure 8:
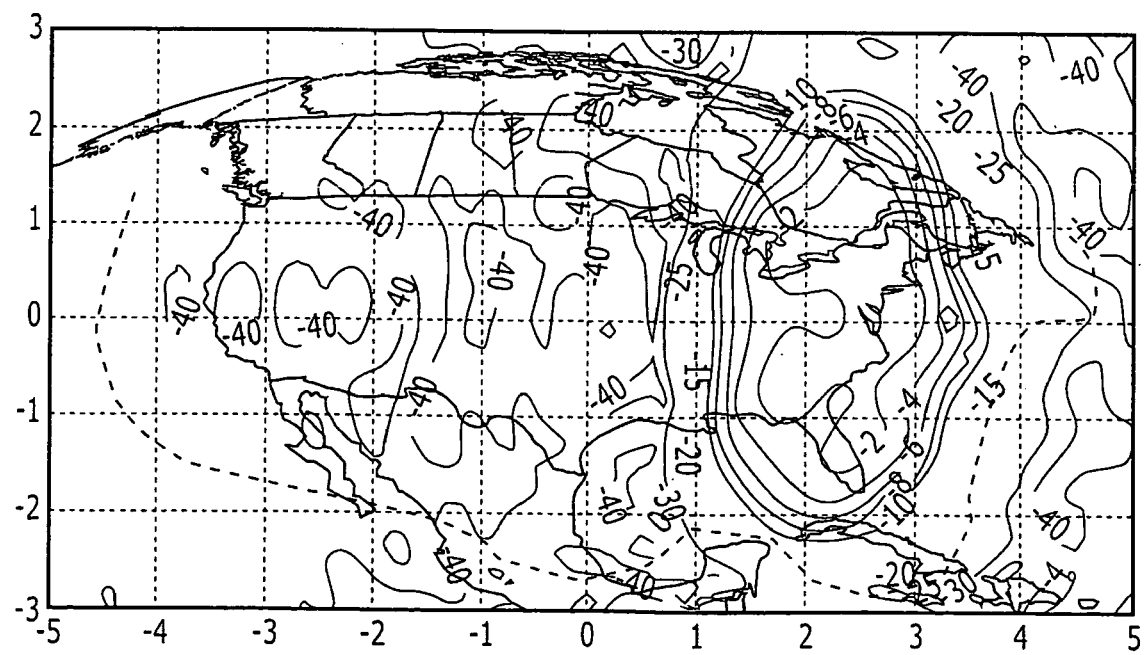
FIG. 8 illustrates beam gain contours (in dB) generated using a phase-unconstrained least squares method according to some embodiments.

FIGS. 5 and 6 show the resulting gain contours for the phase-unconstrained LCMV and least-squares methods, respectively. Both show reasonably good in-beam gain and side lobe suppression.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of operating a transceiver including an antenna having a plurality of antenna feed elements, comprising:
   defining a plurality of real valued antenna gain constraint values associated with a plurality of geographic constraint points within a geographic region;
   generating complex valued antenna feed element weights that result in complex antenna gain values at the geographic constraint points based on the corresponding real valued antenna gain constraint values;
   forming an antenna beam from the antenna to the geographic region using the complex valued antenna feed element weights; and
   transmitting information over the antenna beam.

2. The method of claim 1, wherein the complex antenna gain values at the geographic constraint points having real components that are equal to the corresponding real valued antenna gain constraint values.

3. The method of claim 1, wherein generating the complex valued antenna feed element weights comprises:
   defining a constraint function that relates the real valued antenna gain constraint values to the complex valued antenna feed element weights.

4. The method of claim 3, further comprising:
forming a cost function that is related to a total received power; and
evaluating the constraint function to find a set of complex valued antenna feed element weights that reduces the cost function.

5. The method of claim 4, wherein the cost function comprises:

$$w^H R_y w = \text{MIN}$$

wherein w is a vector of M feed element weights, Ry is an M×M covariance matrix for the M feed elements, and MIN is a scalar value.

6. The method of claim 4, wherein the constraint function comprises:

$$C^H w = f$$

wherein w is a vector of M feed element weights, C is an M×K constant matrix containing responses of the M feed elements at K constraint points and f is a desired response vector at the K constraint points.

7. The method of claim 4, wherein evaluating the constraint function to find a set of complex valued antenna feed element weights that reduces the cost function comprises:
forming a combined expression for the constraint function and the cost function using Lagrange multipliers;
differentiating the combined expression with respect to the complex valued antenna feed element weights;
setting the differentiated combined expression equal to zero and obtaining the complex valued antenna feed element weights in terms of the Lagrange multipliers; and
substituting the complex valued antenna feed element weights into the constraint function.

8. The method of claim 1, further comprising measuring a complex antenna gain value;
transmitting the measured complex antenna gain values to the transceiver; and
adjusting the complex valued antenna feed element weights in response to the measured complex antenna gain value.

9. The method of claim 1, wherein generating the complex valued antenna feed element weights comprises:
evaluating a cost function that comprises squared differences between real components of the complex antenna gain values and the real valued antenna gain constraint values.

10. The method of claim 9, wherein the real valued antenna gain constraint values comprise soft constraint values.

11. The method of claim 10, wherein the cost function comprises:

$$\sum_{n=1}^{N} y'_n y'^*_n + \sum_{p=1}^{P} (\text{Re}\{y''_p\} - f_p)^2 = \text{MIN}$$

wherein $y'_n$ denotes composite amplitude response values at N geographic constraint points having zero amplitude antenna gain constraint values, $y''_p$ denotes composite amplitude response values at P geographic constraint points having non-zero amplitude antenna gain constraint values, and $f_p$ denotes desired real amplitude components at the P geographic constraint points.

12. The method of claim 11, further comprising weighting composite amplitude response values to emphasize respective geographic constraint points based on their relative geographic importance.

13. The method of claim 12, wherein the cost function comprises:

$$\sum_{n=1}^{N} c'_n y'_n y'^*_n + \sum_{p=1}^{P} c''_p (\text{Re}\{y''_p\} - f_p)^2 = \text{MIN}$$

wherein $c'_n$ and $c''_n$ comprise user-defined weighting vectors.

14. The method of claim 9 comprising generating a set of complex antenna feed element weights that reduces the cost function.

15. A transceiver, comprising:
an antenna having a plurality of antenna feed elements; and
an electronics system including a beam former configured to generate complex valued antenna feed element weights that result in complex antenna gain values associated with a plurality of geographic constraint points within a geographic region of the antenna based on corresponding real valued antenna gain constraint values defined for the plurality of geographic constraint points, and to form an antenna beam from the antenna to the geographic region using the complex valued antenna feed element weights.

16. The transceiver of claim 15, wherein the complex antenna gain values at the geographic constraint points have real components that are equal to the corresponding real valued antenna gain constraint values.

17. The transceiver of claim 15, wherein the beam former is further configured to evaluate a constraint function that relates the real valued antenna gain constraint values to the complex valued antenna feed element weights.

18. The transceiver of claim 17, wherein the beam former is further configured to form a cost function that is related to a total received power, and to evaluate the constraint function to find a set of complex valued antenna feed element weights that reduces the cost function.

19. The transceiver of claim 18, wherein the cost function comprises:

$$w^H R_y w = \text{MIN}$$

wherein w is a vector of M feed element weights, Ry is an M×M covariance matrix for the M feed elements, and MIN is a scalar value.

20. The transceiver of claim 18, wherein the constraint function comprises:

$$C^H w = f$$

wherein w is a vector of M feed element weights, C is an M×K constant matrix containing responses of the M feed elements at K constraint points and f is a desired response vector at the K constraint points.

21. The transceiver of claim 18, wherein the beam former is further configured to evaluate the constraint function to find a set of complex valued antenna feed element weights that reduces the cost function by forming a combined expression for the constraint function and the cost function using Lagrange multipliers, differentiating the combined expression with respect to the complex valued antenna feed element weights, setting the differentiated combined expression equal to zero and obtaining the complex valued antenna feed element weights in terms of the Lagrange multipliers, and substituting the complex valued antenna feed element weights into the constraint function.

22. The transceiver of claim 15, wherein the beam former is further configured to receive a measured complex antenna gain value to the transceiver, and to adjust the complex valued antenna feed element weights in response to the measured complex antenna gain value.

23. The transceiver of claim 15, wherein the beam former is configured to generate the complex valued antenna feed element weights by evaluating a cost function that comprises squared differences between real components of the complex antenna gain values and the real valued antenna gain constraint values.

24. The transceiver of claim 23, wherein the real valued antenna gain constraint values comprise soft constraint values.

25. The transceiver of claim 24, wherein the cost function comprises:

$$\sum_{n=1}^{N} y'_n y'^*_n + \sum_{p=1}^{P} (\text{Re}\{y''_p\} - f_p)^2 = \text{MIN}$$

wherein $y'_n$ denotes composite amplitude response values at N geographic constraint points having zero amplitude antenna gain constraint values, $y''_p$ denotes composite amplitude response values at P geographic constraint points having non-zero amplitude antenna gain constraint values, and $f_p$ denotes desired real amplitude components at the P geographic constraint points.

26. The transceiver of claim 25, wherein the beam former is further configured to weight composite amplitude response values to emphasize respective geographic constraint points based on their relative geographic importance.

27. The transceiver of claim 26, wherein the cost function comprises:

$$\sum_{n=1}^{N} c'_n y'_n y'^*_n + \sum_{p=1}^{P} c''_p (\text{Re}\{y''_p\} - f_p)^2 = \text{MIN}$$

wherein $c'_n$ and $c''_n$ comprise user-defined weighting vectors.

28. The transceiver of claim 23, wherein the beam former is configured to generate a set of complex antenna feed element weights that reduces the cost function.

29. A communications satellite, comprising:
an antenna having a plurality of antenna feed elements; and
an electronics system including a beam former configured to generate complex valued antenna feed element weights that result in complex antenna gain values associated with a plurality of geographic constraint points within a geographic region of the antenna based on corresponding real valued antenna gain constraint values defined for the plurality of geographic constraint points, and to form an antenna beam from the antenna to the geographic region using the complex valued antenna feed element weights.

30. A satellite gateway, comprising:
an electronics system including a beam former configured to generate complex valued antenna feed element weights for antenna feed elements of an antenna of a remote satellite that result in complex antenna gain values associated with a plurality of geographic constraint points within a geographic region of the satellite antenna based on corresponding real valued antenna gain constraint values defined for the plurality of geographic constraint points, and to transmit the complex valued antenna feed element weights to the satellite for use in forming an antenna beam from the satellite antenna to the geographic region.

* * * * *

UNITED STATES PATENT AND TRADEMARK OFFICE
CERTIFICATE OF CORRECTION

Page 1 of 3

PATENT NO. : 7,978,135 B2
APPLICATION NO. : 12/370224
DATED : July 12, 2011
INVENTOR(S) : Churan It is certified that error appears in the above-identified patent and that said Letters Patent is hereby corrected as shown below:

In the Patent:

Column 2, Line 12: Please correct "$w^H Ryw=MIN$" to read -- $\underline{w}^H \underline{Ry}\underline{w}=MIN$ --
 Line 13: Please correct "w" to read -- $\underline{w}$ -- and
  correct "Ry" to read -- $\underline{Ry}$ --
 Line 19: Please correct "$C^H w=f$" to read -- $\underline{C}^H \underline{w}=\underline{f}$ --
 Line 21: Please correct "w" to read -- $\underline{w}$ -- and
  correct "C" to read -- $\underline{C}$ --
 Line 23: Please correct "f" to read -- $\underline{f}$ --

Column 8, (1), Line 41: Please correct "$w^H R_y w=MIN$."
  to read -- $\underline{w}^H \underline{R_y}\underline{w}=MIN$ --
 Line 42: Please correct "w" to read -- $\underline{w}$ --
 Line 43: Please correct "$R_y$" to read -- $\underline{R_y}$ --
 (2), Line 46: Please correct "$C^H w=f$" to read -- $\underline{C}^H \underline{w}=\underline{f}$ --
 Line 47: Please correct "C" to read -- $\underline{C}$ --
 Line 49: Please correct "f" to read -- $\underline{f}$ --
 (3), Line 54: Please correct "$H(w)=w^H R_y w+\lambda^H[C^H-w-f]$"
  to read -- $H(\underline{w})=\underline{w}^H \underline{R_y}\underline{w}+\underline{\lambda}^H[\underline{C}^H \underline{w}-\underline{f}]$ --
 Line 55: Please correct "λ" to read -- $\underline{\lambda}$ --
 Line 57: Please correct "w" to read -- $\underline{w}$ --
 (4), Line 60: Please correct "$w=-R_y^{-1}C\lambda$" to read -- $\underline{w}=-\underline{R_y}^{-1}\underline{C}\underline{\lambda}$ --
 Line 61: Please correct "λ" to read -- $\underline{\lambda}$ --

Signed and Sealed this
Third Day of April, 2012

David J. Kappos
*Director of the United States Patent and Trademark Office*

CERTIFICATE OF CORRECTION (continued)
U.S. Pat. No. 7,978,135 B2

Column 8, (5), Line 63: Please correct "$\lambda = -[C^H R_y^{-1} C]^{-1} f$"

to read -- $\underline{\lambda} = -[\underline{C}^H \underline{R}_y^{-1} \underline{C}]^{-1} \underline{f}$ --

Line 65: Please correct "w" to read -- $\underline{w}$ --

(6), Line 67: Please correct "$w = R_y^{-1} C [C^H R_y^{-1} C]^{-1} f$"

to read -- $\underline{w} = \underline{R}_y^{-1} \underline{C} [\underline{C}^H \underline{R}_y^{-1} \underline{C}]^{-1} \underline{f}$ --

Column 9, (7), Line 4: Please correct "Re{$C^H w$}=f" to read -- $\mathbf{Re}\{\underline{C}^H \underline{w}\} = \underline{f}$ --

Line 6: Please correct "f" to read -- $\underline{f}$ --

Line 7: Please correct "Re{α}" to read -- $\mathbf{Re}\{\alpha\}$ --

(8), Line 9: Please correct "$C^H w + [w^H C]^T = 2f$"

to read -- $\underline{C}^H \underline{w} + [\underline{w}^H \underline{C}]^T = 2\underline{f}$ --

Line 10: Please correct "H(w)" to read -- $H(\underline{w})$ --

(9), Line 13: Please correct "$H(w) = w^H R_y w + \lambda^H [C^H w + [w^H C]^T - 2f]$"

to read -- $H(\underline{w}) = \underline{w}^H \underline{R}_y \underline{w} + \underline{\lambda}^H [\underline{C}^H \underline{w} + [\underline{w}^H \underline{C}]^T - 2\underline{f}]$ --

Line 14: Please correct "w" to read -- $\underline{w}$ --

(10), Line 17: Please correct "$w = -R_y^{-1} C \lambda$" to read -- $\underline{w} = -\underline{R}_y^{-1} \underline{C} \underline{\lambda}$ --

Line 20: Please correct "λ" to read -- $\underline{\lambda}$ --

Line 21: Please correct "λ" to read -- $\underline{\lambda}$ --

(11), Line 23: Please correct "$\lambda = -[\mathrm{Re}\{C^H R_y^{-1} C\}]^{-1} f$"

to read -- $\underline{\lambda} = -[\mathbf{Re}\{\underline{C}^H \underline{R}_y^{-1} \underline{C}\}]^{-1} \underline{f}$ --

Line 25: Please correct "w" to read -- $\underline{w}$ --

(12), Line 27: Please correct "$w = R_y^{-1} C [\mathrm{Re}\{C^H R_y^{-1} C\}]^{-1} f$"

to read -- $\underline{w} = \underline{R}_y^{-1} \underline{C} [\mathbf{Re}\{\underline{C}^H \underline{R}_y^{-1} \underline{C}\}]^{-1} \underline{f}$ --

(13), Line 47: Please correct "$y = A^H w$" to read -- $\underline{y} = \underline{A}^H \underline{w}$ --

Column 9, (14a), Line 54: Please correct "$y' = A'^H w$" to read -- $\underline{y}' = \underline{A}'^H \underline{w}$ --

(14b), Line 55: Please correct "$y'' = A''^H w$" to read -- $\underline{y}'' = \underline{A}''^H \underline{w}$ --

CERTIFICATE OF CORRECTION (continued)
U.S. Pat. No. 7,978,135 B2

Column 10, Line 13: Please correct "w" to read -- $\underline{w}$ --
Line 17: Please correct "w" to read -- $\underline{w}$ --
Line 25: Please correct "weighs w" to read -- weighs $\underline{w}$ -- and correct "in w." to read -- in $\underline{w}$. --
Line 31: Please correct "/dw=0" to read -- $/d\underline{w}=0$ --
Line 32: Please correct "Re{y″$_p$}" to read -- Re{y″$_p$} --
Line 58: Please correct "weights w" to read -- weights $\underline{w}$ --

Column 11, Line 23: Please correct "in w:" to read -- in $\underline{w}$: --

In the Claims
Column 13, Claim 5, Line 10: Please correct "w$^H$Ryw=MIN" to read -- $\underline{w}^H\underline{Ry}\underline{w}$=MIN --
Line 12: Please correct "wherein w" to read -- wherein $\underline{w}$ -- and correct "Ry is" to read -- $\underline{Ry}$ is --

Claim 6, Line 18: Please correct "C$^H$w=f" to read -- $\underline{C}^H\underline{w}=\underline{f}$ --
Line 20: Please correct "wherein w" to read -- wherein $\underline{w}$ -- and correct "C is" to read -- $\underline{C}$ is --
Line 22: Please correct "and f is" to read -- and $\underline{f}$ is --

Column 14, Claim 19, Line 47: Please correct "w$^H$Ryw=MIN" to read -- $\underline{w}^H\underline{Ry}\underline{w}$=MIN --
Line 48: Please correct "wherein w" to read -- wherein $\underline{w}$ -- and correct "Ry is" to read -- $\underline{Ry}$ is --

Claim 20, Line 54: Please correct "C$^H$w=f" to read -- $\underline{C}^H\underline{w}=\underline{f}$ --
Line 55: Please correct "wherein w" to read -- wherein $\underline{w}$ -- and correct "C is" to read -- $\underline{C}$ is --
Line 57: Please correct "and f is" to read -- and $\underline{f}$ is --